(12) United States Patent
Oliver et al.

(10) Patent No.: US 7,806,463 B2
(45) Date of Patent: Oct. 5, 2010

(54) TRAVEL TRAILER

(75) Inventors: James Oliver, Hohenwald, TN (US);
Daniel Oliver, Linden, TN (US); Scott Oliver, Linden, TN (US)

(73) Assignee: Precision Polymers, LLC, Hohenwald, TN (US)

( * ) Notice: Subject to any disclaimer, the term of this patent is extended or adjusted under 35 U.S.C. 154(b) by 311 days.

(21) Appl. No.: 12/106,325

(22) Filed: Apr. 20, 2008

(65) Prior Publication Data
US 2008/0258497 A1 Oct. 23, 2008

Related U.S. Application Data

(60) Provisional application No. 60/913,253, filed on Apr. 20, 2007.

(51) Int. Cl.
*B60P 3/335* (2006.01)
(52) U.S. Cl. .................. 296/168; 296/24.3; 296/181.1; 296/193.04; 296/35.1
(58) Field of Classification Search ................. 296/156, 296/168, 164, 24.3, 181.1, 181.2, 193.04, 296/35.1
See application file for complete search history.

(56) References Cited

U.S. PATENT DOCUMENTS

| | | | | |
|---|---|---|---|---|
| 3,409,323 A | * | 11/1968 | Schweser | 296/181.2 |
| 3,565,480 A | * | 2/1971 | McCollum et al. | 296/168 |
| 4,149,748 A | * | 4/1979 | Tanner | 296/168 |
| 5,556,498 A | * | 9/1996 | Blanchard | 156/245 |
| 5,833,295 A | | 11/1998 | Farlow | |
| 5,934,745 A | * | 8/1999 | Moore et al. | 296/193.04 |
| 6,565,144 B1 | | 5/2003 | Crean | |
| 6,729,678 B1 | | 5/2004 | Atcravi | |
| 7,021,699 B2 | | 4/2006 | Crean | |
| 7,121,613 B1 | | 10/2006 | Rasmussen | |
| 7,144,070 B2 | * | 12/2006 | Wiebe et al. | 296/185.1 |
| 7,258,390 B2 | * | 8/2007 | Fisher et al. | 296/168 |
| 2006/0138803 A1 | * | 6/2006 | Gehman et al. | 296/168 |
| 2006/0273622 A1 | * | 12/2006 | Laird | 296/168 |

* cited by examiner

*Primary Examiner*—Jason S Morrow
(74) *Attorney, Agent, or Firm*—Baker Donelson Bearman Caldwell & Berkowitz, PC

(57) ABSTRACT

A travel trailer having exterior unitary lower and upper shells, an interior lower shell defining a pre-molded floor and side walls with a seating area, a cabinet for refrigerator and stove top, an opposing bench, a bathroom sink, and defining an aisle centrally therebetween; a shower pan attached to a side wall; an interior upper shell defining a pre-molded ceiling, side walls, and storage areas; a wall defining a door to a bathroom portion; and a wheeled chassis connected to the exterior lower shell with an extending tongue for attaching to a trailer hitch of a motor.

11 Claims, 10 Drawing Sheets

TRAVEL TRAILER

This application claims the benefit under 35 U.S.C. 120 of co-pending U.S. provisional patent application Ser. No. 60/913,253, filed Apr. 20, 2007.

TECHNICAL FIELD

The present invention relates to travel trailers. More particularly, the present invention relates to a travel trailer assembled from mating shells with features that facilitate the use of the travel trailer.

BACKGROUND OF THE INVENTION

The travel trailer industry provides towable wheeled campers for recreational travel, sport, camping and like activities. Towable vehicles include a range of vehicles from wheeled carriers that unfold to provide a foundation and an erectable tent to towable travel housings or trailers. The travel trailers typically include sleeping space such as platforms or supports for mattresses and cushions, kitchen appliances including refrigerators, ovens, stovetops, and dishwashers, as well as washing basins, showers, cabinetry, sanitary facilities, and tables and seating areas. Often such towable travel trailers have storage tanks for freshwater and for sanitary waste, supplies of fuel, electric generators, and connector for attaching to a local electrical grid.

Towable housing units include a wheeled chassis configured for connecting through a trailer tongue to a hitch on a tow vehicle. The chassis carries the frame of the housing which is closed with sidewall panels and a finished interior. Cabinetry installs with fasteners to the frame work of the housing, including, for example, overhead cabinets that attach to ceiling areas, pedestal cabinets for seating areas, and base cabinets for containing or holding appliances such as refrigerators, ovens, and stovetops, as well as television and stereo equipment. Electrical wires and water pipes mount inside walls.

The manufacturing of such mobile housing trailers accommodates customization by the purchaser selecting among various alternatives for the fixtures and cabinetry. However, the manufacturer of such towable trailers is labor intensive, and requires separate components to be brought to the travel trailer for installation during construction and assembly.

Accordingly, there is a need in the art for a readily assembled travel trailer. It is to such that the present invention is directed.

SUMMARY OF THE INVENTION

The present invention meets the need in the art by providing a travel trailer, comprising an exterior lower shell and an exterior upper shell, each molded as a single unitary body and configured with a mating edge for overlapping joining of the exterior lower shell and the exterior upper shell, the opposing exterior lower shell and the exterior upper shell each defining a slotted opening extending from the respective edge for a passageway into an interior of the travel trailer. An interior lower shell received in the exterior lower shell defines pre-molded floor and side walls, and having a seating area with opposed benches, a cabinet structure configured for receiving a refrigerator and stove top, an opposing bench, a bathroom sink, and defining an aisle centrally therebetween. A shower pan seats on the floor and attaches to at least one side wall. An interior upper shell received in the exterior upper shell defines a pre-molded ceiling, opposing side walls, opposing L-shaped walls extending from the ceiling and extending to a respective side wall to define storage areas accessed through selectively operated doors. A wall defines a second door to separate a bathroom portion in which the shower pan is installed. A wheeled chassis connected to the exterior lower shell includes a longitudinally extending tongue configured for attaching to a trailer hitch of a motor vehicle for moving the travel trailer.

Objects, advantages, and features of the present invention will become apparent upon a reading of the following detailed description with reference to the drawings and the appended claims.

DETAILED DESCRIPTION

Figure 1:
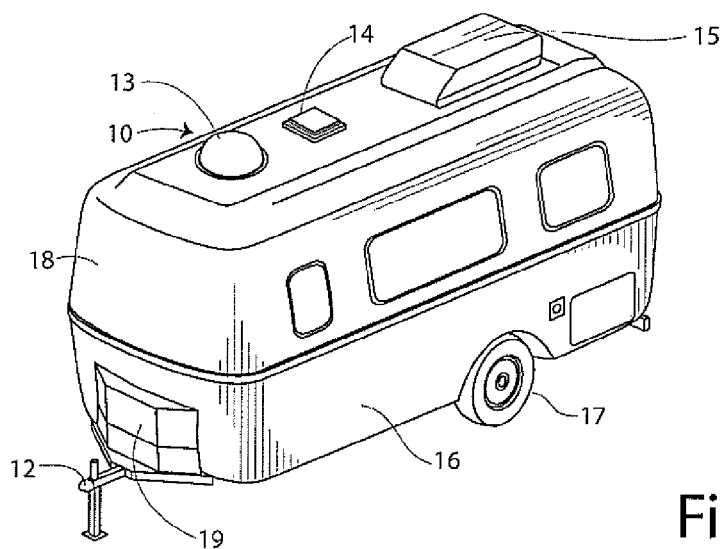
FIG. 1 illustrates in perspective view a travel trailer according to the present invention.
Figure 5:
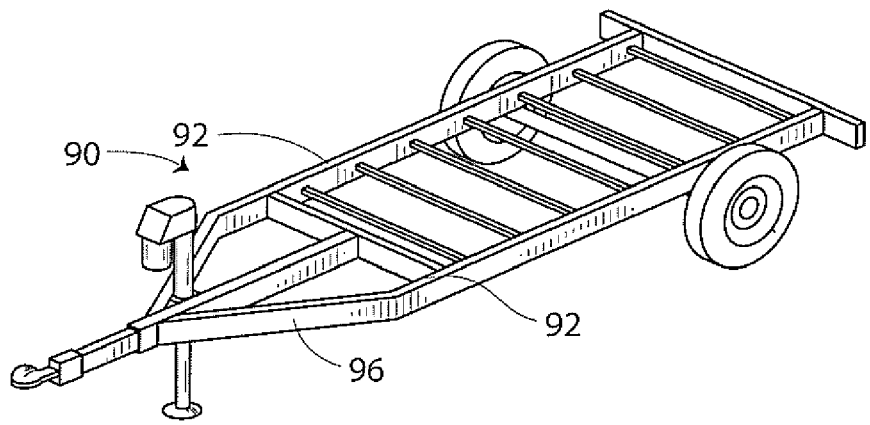
FIG. 5 illustrates a chassis for supporting the travel trailer shown in FIG. 1.

With reference to the drawings, in which like parts have like identifiers, FIG. 1 illustrates in perspective view a travel trailer 10 according to the present invention. The travel trailer includes a wheeled ladder-frame chassis (best illustrated in FIG. 5 and discussed below) having an axle and opposing wheels, with the axle supported by conventional suspension devices. As shown in FIG. 5, the suspension includes shock absorbers and leaf springs. A travel trailer hitch 12 protrudes from a first end for conventionally connecting the travel trailer 10 to a ball hitch of a tow vehicle (not illustrated). The roof supports a satellite antennae 13 as an optional entertainment feature, a vent 14, and an HVAC device 15 for cooling and heating the travel trailer 10.

The travel trailer 10 assembles from shells molded of fiberglass. The travel trailer 10 has an exterior lower shell 16 and an exterior upper shell 18. The shells enclose separate interior shells, discussed below. The shells 16, 18 matingly connect at opposing open edges to define substantially a mid-point of the height of the travel trailer 10. The exterior shells enclose the interior shells and the space between the shells receives insulation materials and provides room for wiring and plumbing pipes. Fasteners secure overlapping edges of the exterior lower shell 16 and exterior upper shell 18 to rigidly connect the shells together. A cowling 19 mounts to a tongue portion of the chassis. The cowling 19 encloses propane fuel tanks.

Figure 2:
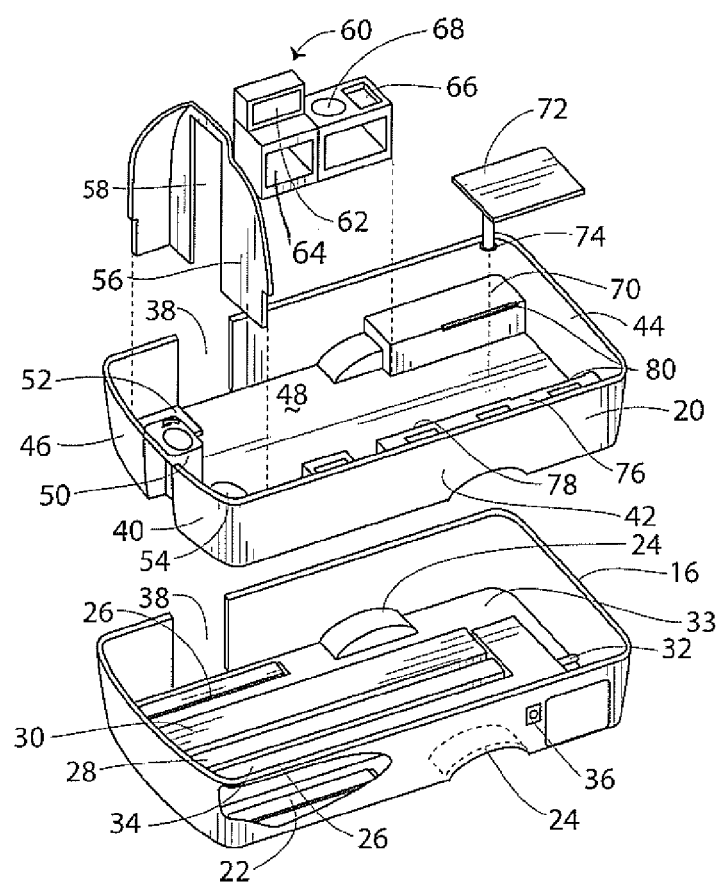
FIG. 2 illustrates in exploded perspective view a lower exterior shell and an interior lower shell.

The travel trailer 10 assembles from modular construction to minimize labor and assembly. FIG. 2 illustrates the exterior lower shell 16 exploded away from the interior lower shell 20. The exterior lower shell 16 defines a sub-floor space generally 22.

Figure 6:
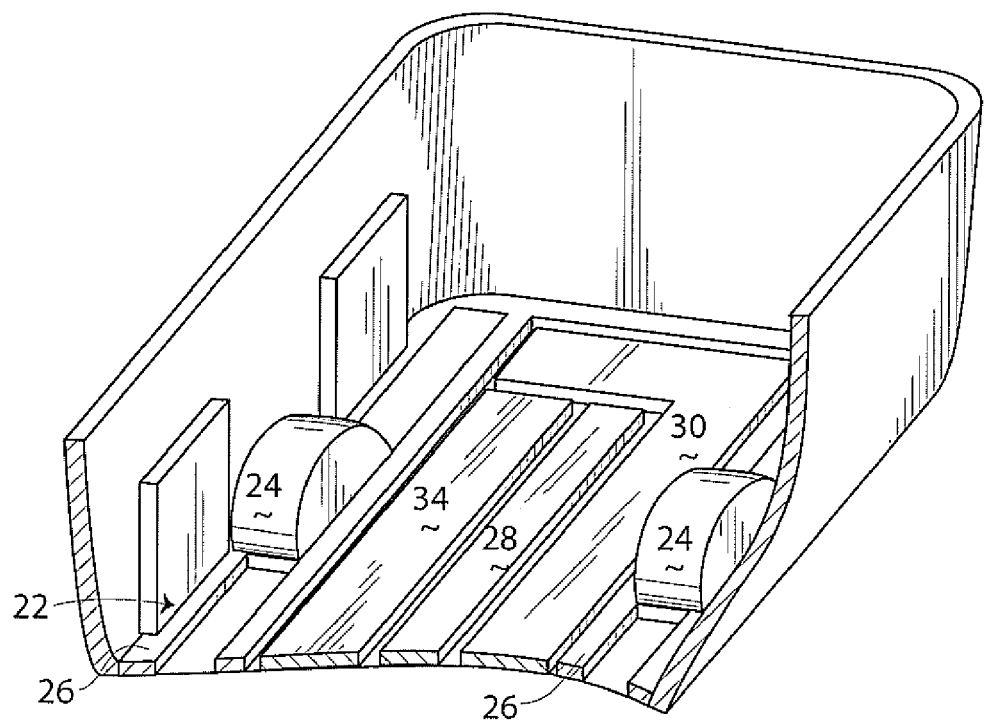
FIG. 6 illustrates in perspective view portions of the exterior lower shell for the travel trailer shown in FIG. 1.

With reference to FIGS. 2 and 6, the sub-floor space 22 defines opposed wheel wells 24 and spaced-apart frame channels 26 and an intermediate channel 28. A holding tank 30 for gray water or sanitary waste mounts in the space between one of the frame channels 26 and the intermediate channel 28. The gray water tank 30 includes a discharge 32 which couples to a suction hose (illustrated in FIG. 15) for removal of waste gray water from the holding tank to a treatment facility. A fresh water tank 34 mounts in the opposing space between the other frame channel 26 and the intermediate channel 28. The fresh water tank 34 connects to an inlet 36 for filling the tank with fresh water. The fresh water tank 34 communicates through a pump (not illustrated) to piping for communicating the water to a sink, a shower, and a toilet within the travel trailer 10. A sidewall defines a gap 38 for a doorway. A rear portion generally 33 provides space for equipment such as a water pump and a hot water heater (not illustrated).

With continuing reference to FIG. 2, an interior lower shell 40 is illustrated exploded from the exterior lower shell 16. The interior lower shell 40 is molded of fiberglass and provides opposing side walls 42, a back wall 44, a front wall 46, and an integral floor 48. A sink 50 is molded in a bathroom portion of the interior shell 40. A shower stall 52 and a commode 54 is installed in the bathroom area. A bracket for installation of a shower stall tub is disclosed in co-pending U.S. application Ser. No. 60/912,889 filed Mar. 19, 2007, and incorporated herein it its entirety by reference.

The sink, shower 52, and commode 54 communicate with piping (not illustrated) with the fresh water tank 34 and the gray water tank 30. A wall 56 mounts to the floor 48 to separate the living area from the bathroom area. The wall includes an opening or notch 58 for a door (not illustrated). The interior lower shell 40 receives kitchen cabinet structures generally 60 including spaces for a microwave 62, a refrigerator 64, a sink 66, and a range 68. A bench 70 mounts to a sidewall and includes openings (illustrated in the front face for access into storage). A table 72 mounts on a pedestal 74. Opposing cabinets 76 mount to the opposite wall 72 and include similar closable openings 78 for access to storage space and to infrastructural piping such as electrical and water handling conduits. The storage benches 70, 76 can be molded with the interior lower shell or be separate assemblies installed separately.

The benches 70 and 76 each have recessed notches 80 in facing upper edges. Respective edges of the table top 72 seat in the notches 80 for supporting the table top level with the benches 70 and 76. Mattress or cushions (not illustrated) placed on the benches 70, 76 and table top 72 enable the rear area of the travel trailer to be used for sleeping. The pedestal 74 is a conventional type that permits the table top to be moved to a lowered or recessed position for use as a sleeper support and an elevated position for use as a table top with seating provided by the benches 70, 76.

Figure 3:
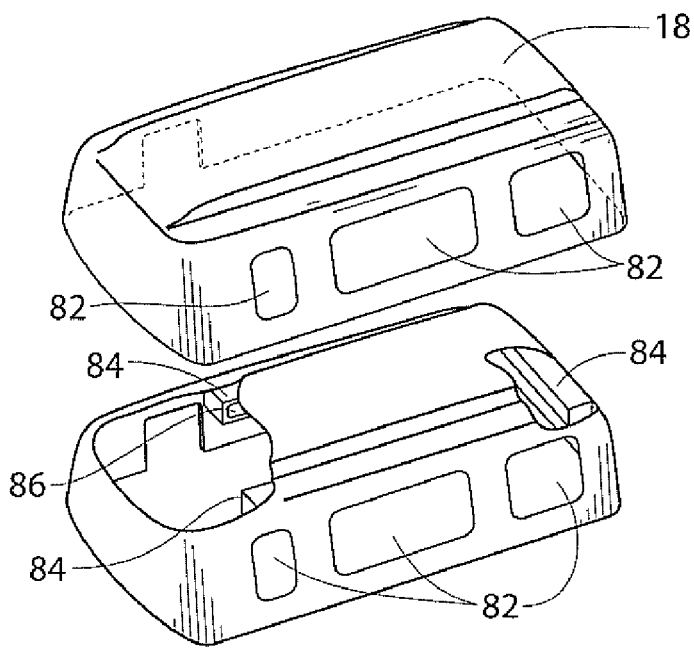
FIG. 3 illustrates in exploded perspective cut-away view an interior upper shell and an exterior upper shell.
Figure 7:
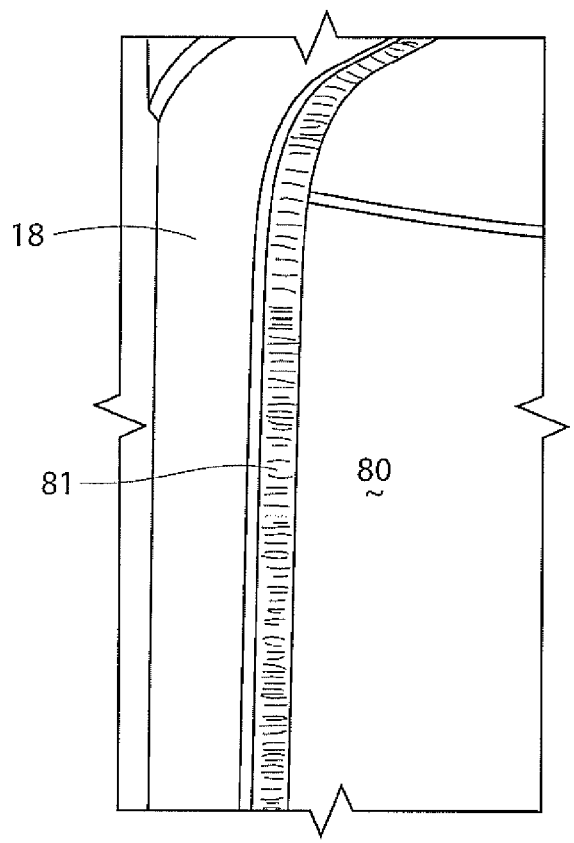
FIG. 7 illustrates an opening in a side wall for a window.

FIG. 3 illustrates in an exploded perspective view the interior upper shell 80 formed as a unitary member. Openings 82 for windows are illustrated and align with openings in the exterior upper shell 18. FIG. 7 illustrates in perspective detailed view a side wall portion of the upper exterior shell 18 and upper interior shell 80 with a cut edge 81 that defines an opening 82. With continued reference to FIG. 3, the interior upper shell 80 includes cabinets 84 on opposing sides of the shell. The cabinets 84 include openings 86 for access into the interior space of the cabinets. The openings are readily selectively closed with doors such as cabinet doors having hinges that attach with fasteners to side faces around the openings. In addition, sliding panel doors can be used, and a track member for use with sliding panel doors is disclosed in pending U.S. application Ser. No. 60/912,880 filed Apr. 19, 2007, and incorporated herein in its entirety by reference.

Figure 8:
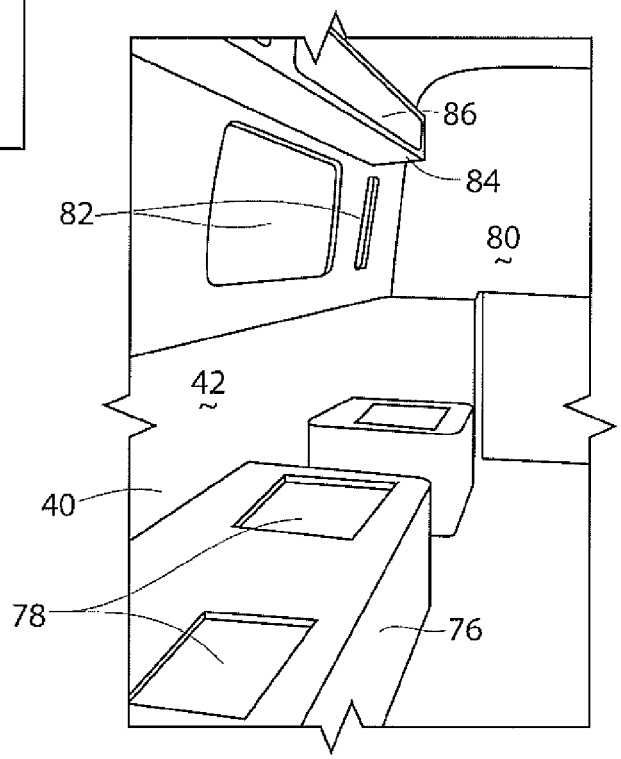
FIG. 8 illustrates in perspective view a portion of the travel trailer in which benches molded in the inerior lower shell in the interior of the travel trailer with openings that will receive covers for selective access to storage space and to equipment such as wiring and pipes and molded cabinets in the upper interior shell.

FIG. 8 illustrates in perspective view a portion of the travel trailer 10 in which benches 76, 70 molded in the inerior lower shell 40 define openings that will receive covers for selective access to storage space and to equipment such as wiring and pipes. The upper interior shell 80 includes molded cabinets generally 84 that define openings 86 for storage.

FIG. 5 illustrates in perceptive view a chassis 90. The chassis is a "ladder-frame" structure. The chassis has two spaced-apart longitudinal tubular members 92 that define sides of the chassis. The members 82 interconnect with spaced-apart transverse members 94. A tongue portion generally 96 terminates in a hitch 12 for connecting the chassis to a tow vehicle.

Figure 4:
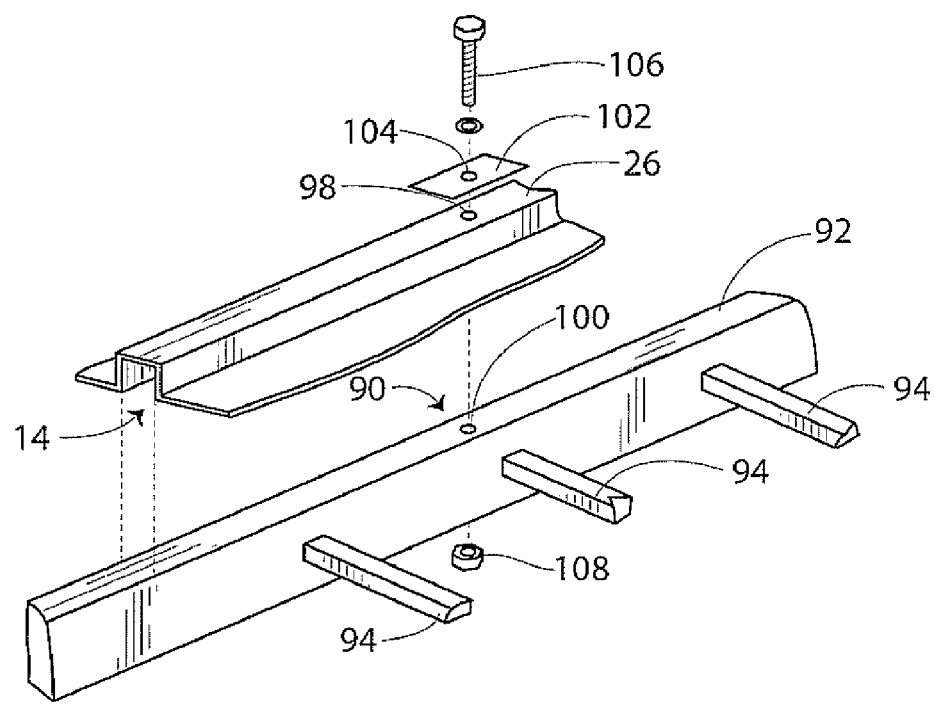
FIG. 4 illustrates in perspective partial view a portion of a chassis exploded from a portion of the exterior lower shell, to show the connection thereof.

FIG. 4 illustrates in exploded perspective detail view a portion of the chassis 90 and a portion of the exterior lower shell 16, to illustrate the connection of the exterior lower shell to the chassis. The longitudinal members 92 are received within a respective channel 26 of the exterior lower shell 16. The transverse members 94 support the intermediate floor portion between the adjacent channels 26, 28. Openings 98, 100 are formed in the channel 26 and the member 92, respectively. A plate 102 seats on the channel 26. The plate 102 defines an opening 104 that aligns with the openings 98, 100. A bolt 103 extends through the opening 104 of the plate 102 and through the openings 98, 100. A nut 108 threadly engages the bolt 103. A least four such fastening connections are made to secure the exterior lower shell to the chassis 90. Other securing structures are readily applicable to connect the chassis 90 and the exterior lower shell 16.

Figure 9:
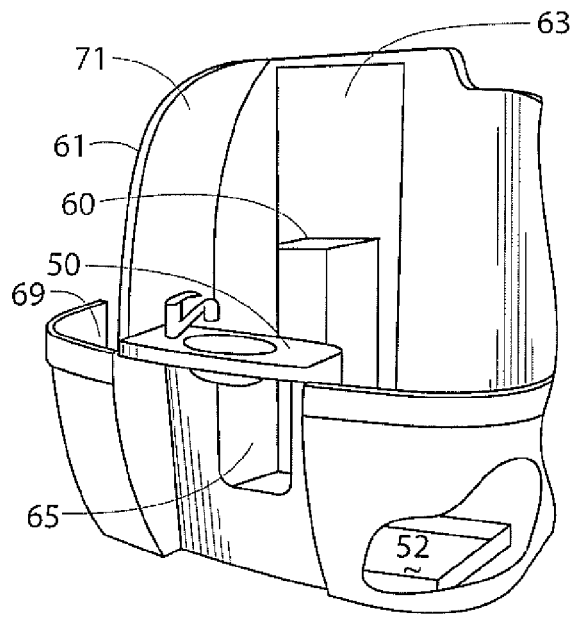
FIG. 9 illustrates a bathroom assembly that inserts into the exterior lower shell to define a wall that separates the bathroom area from the living space of the travel trailer.

FIG. 9 illustrates a rear perspective view of a bathroom assembly 61 that inserts into the exterior lower shell 16 as a unit to define a transverse wall 56 that separates the bathroom area from the living space of the travel trailer. An opening 63 receives a door (not illustrated) for closing the bathroom area. The assembly 61 provides a molded in-place sink 50 with a storage space 65 below (closed by a cabinet door attached after installation of the assembly) and an area 67 (shown cut-away) for a shower stall or tub 52. A storage space 69 is defined by a wall 71 extending from the wall 56. As illustrated, a faucet readily attaches to the sink 50 for connection to water supply and drain pipes.

Figure 10:
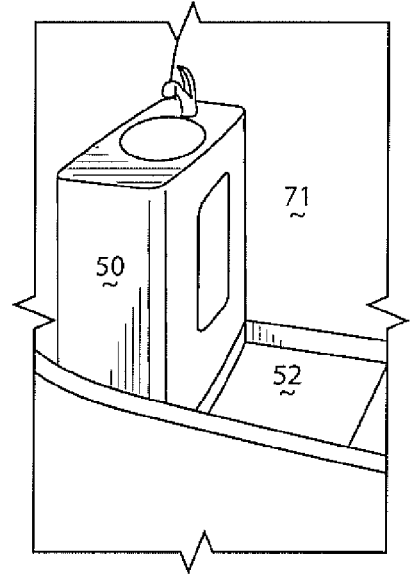
FIG. 10 illustrates a portion of the bathroom assembly including a shower tub and a sink.

FIG. 10 illustrates a portion of the bathroom assembly 61 including the shower tub 52 and the sink 50. The molded assembly includes the storage space accessed through an opening that is closed by a cabinet door added during construction of the trailer 10.

Figure 11:
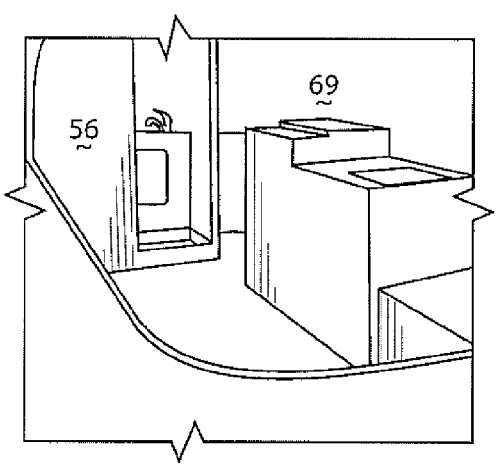
FIG. 11 illustrates the wall of the bathroom assembly in the lower exterior shell separating the living space of the travel trailer.

FIG. 11 illustrates the wall 56 of the bathroom assembly 61 positioned in the lower exterior shell 16 and separating the living space of the travel trailer from the bathroom area. A gap between the wall 71 and appliance cabinets 60 provides space from walking into the travel trailer from the doorway and an adjacent storage space 69.

Figure 12:
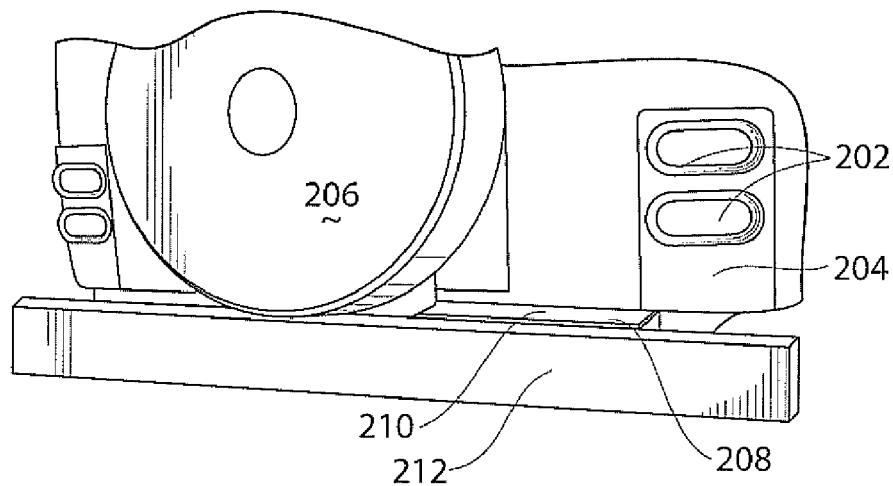
FIG. 12 illustrates a fragmentary rear view of the travel trailer with a bumper member in a first position.

FIG. 12 illustrates a fragmentary rear view of the travel trailer 10. Brake lights generally 202 mount in recessed fields 204 on opposing sides of the back. A cover 206 attaches to the back to enclose a spare tire that mounts to a threaded shaft for securing the tire from movement during travel, or other conventional spare tires support device. A bumper 208 attaches to the back of the travel trailer. The bumper 208 includes a bumper housing 210 and a bumper member 212. The bumper housing and bumper member are manufactured of aluminum, although other materials are usable.

Figure 13:
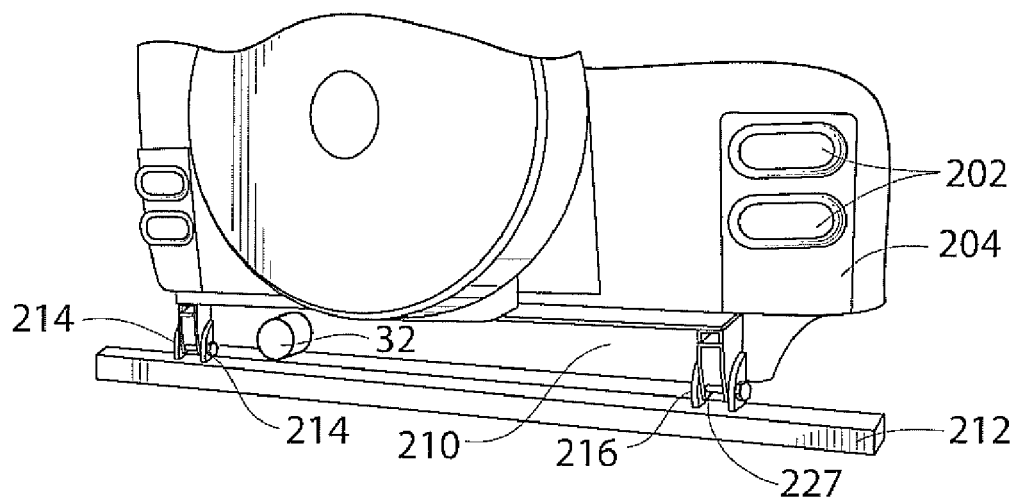
FIG. 13 illustrates a fragmentary rear view of the travel trailer with the bumper member in a second position.
Figure 14:
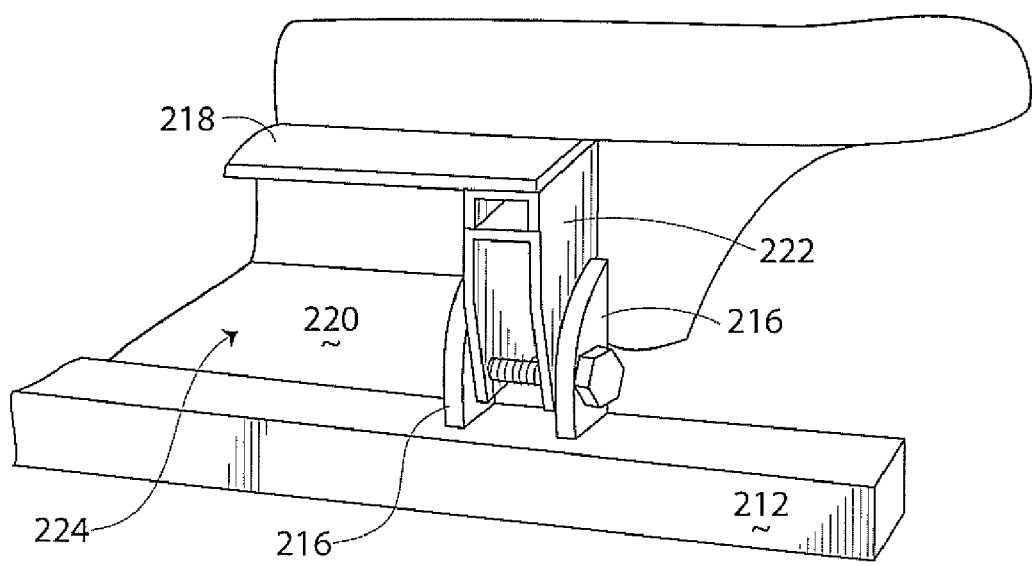
FIG. 14 illustrates a fragmentary rear view of the travel trailer with the bumper member in the second position.

With reference to FIGS. 13 and 14, the bumper member 212 includes two spaced-apart pairs of flanges 214, 216. The flanges 214, 216 extend from an interior lower face of the bumper member 212. The flanges define a through-bore that receives a shaft such as a bolt 227 or other axle member.

The bumper housing 210 includes a top plate 218 an opposing lower plate 220 and sidewalls 222 defined by a tube structure. The sides 222 have an opening that aligns with the through-bore opening in the flanges 214, 216. The bolt 227 extends through the flanges and the side. The bumper member 212 thereby pivotally attaches to the bumper housing 210. The bumper member 212 moves from a first position shown in FIG. 12 to a second position as shown in FIGS. 13 and 14 whereby the bumper housing 210 is open. The top plate 218, lower plate 220, and sides 222 define a receiving cavity 224 for storage of tools and other items in the bumper 208.

Figure 15:
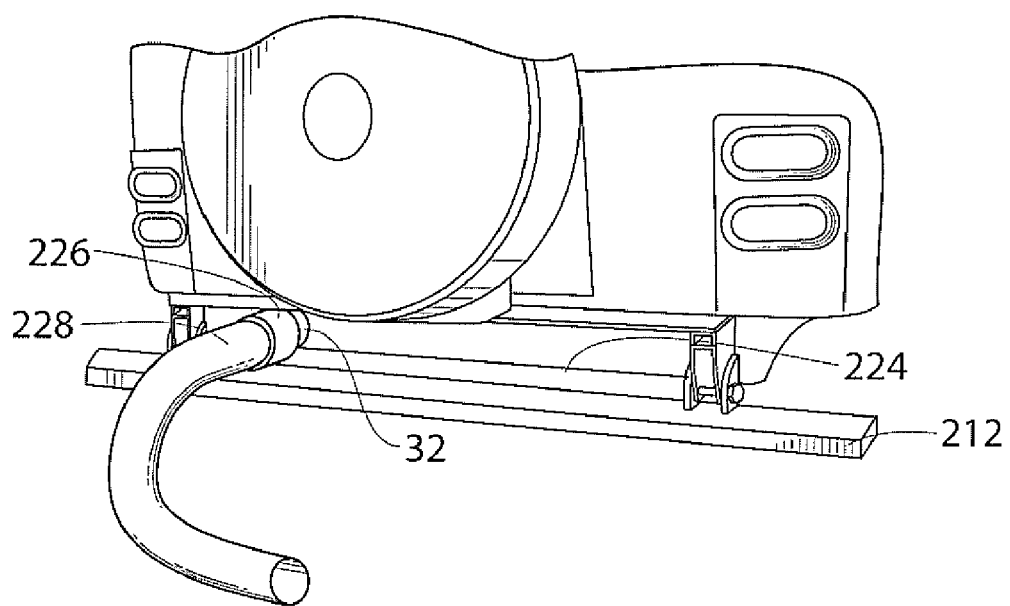
FIG. 15 illustrates a fragmentary view of the bumper member in the second position and a sanitary pipe connected to a sanitary outlet.

With reference to FIG. 15, the cavity 224 of the bumper housing 210 communicates between the exterior lower shell 16 and the interior lower shell 40. Particularly, a discharge 226 connects with a pipe to the waste water tank 30. A hose 228 connects to the discharge for coupling the waste tank 30 to a sanitary water treatment system.

Figure 16:
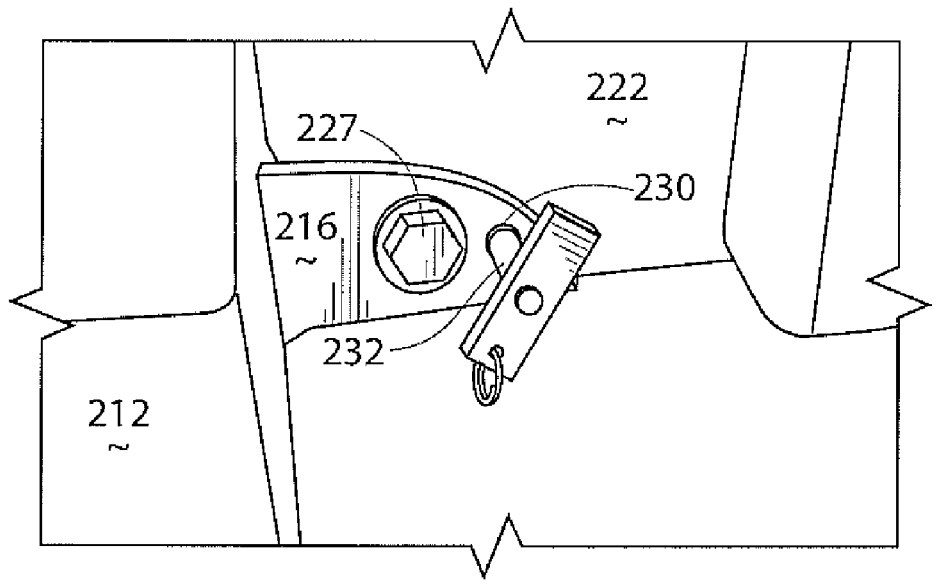
FIG. 16 illustrates a detailed side perspective view of the bumper member in the first position and connected to a side of a bumper housing.
Figure 17:
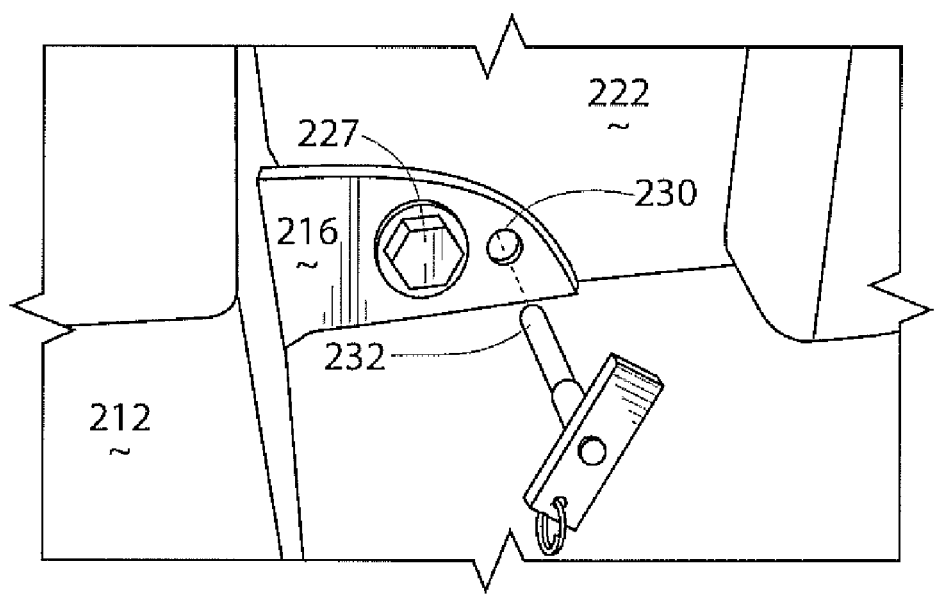
FIG. 17 illustrates a pin used for securing the bumper member in the first position connected to a side of a bumper housing.

FIGS. 16 and 17 illustrate detailed side perspective views of the bumper member 212 connected to the side 222. The flanges 216, 214 each define an opening 230 and the respective side 222 defines an aligned opening. A pin 232 extends through the aligned openings to lock the bumper member 212 in the first position closing the cavity 224 of the bumper housing 210. FIG. 17 depicts a push-button, quick release spring-biased connector for the pin 232, but the pin 232 could readily be a through bolt or other longitudinal member that extends through the aligned openings in the flanges 214, 216 and the respective side 222.

Figure 18A:
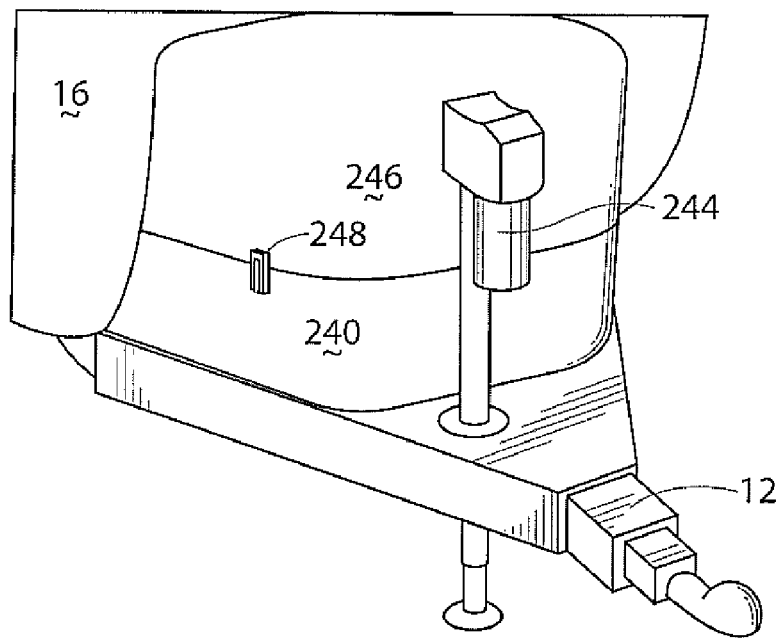
FIG. 18 illustrates the travel trailer in perspective detailed front view and showing a storage cowling.
Figure 18B:
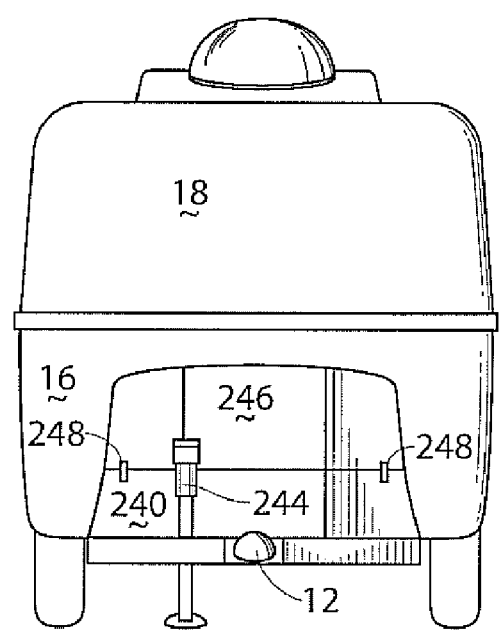
Figure 19:
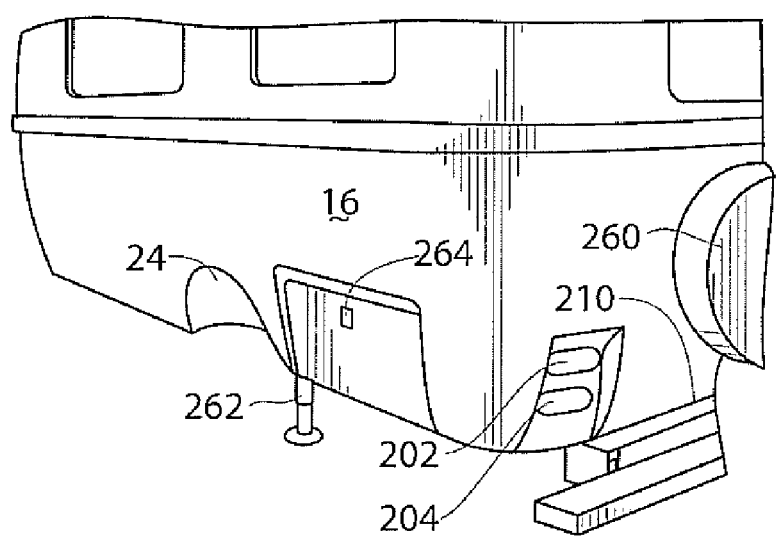
FIG. 19 illustrates the storage cowling with a cover removed to show propane fuel tanks contained in the cowling.

FIG. 18 is a detailed front view of the travel trailer 10. A storage compartment is defined by a cowling 240 that mounts to the frame members of the chassis 90. The trailer hitch 12 extends from the chassis. A jack 244 mounts to the chassis for supporting the travel trailer level when positioned at a camp site or storage. A detachable cover 246 connects with latches 248 to the cowling 240. As illustrated in FIG. 19, the cowling 240 encloses propane tanks 250 that are secured in place with supports 252. The propane tanks communicate through a valve 254 to supply propane to the kitchen equipment including the range and a propane operated refrigerator optionally provided with the travel trailer 10 as well as optionally to a propane water heater.

Figure 20:
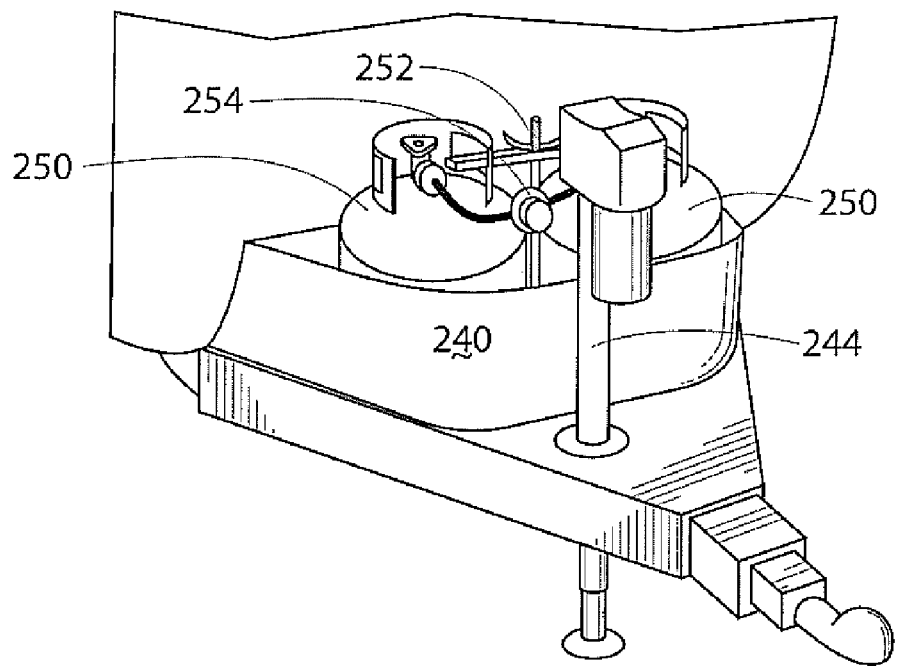
FIG. 20 illustrates the travel trailer in perspective rear side view.

FIG. 20 illustrates in perspective rear side view the travel trailer 10. The cover 206 is removed illustrating a spare tire 260 mounted to the back of the travel trailer 10. The wheel well 24 is recessed in the sidewall of the lower exterior shell 16. A support jack 262 mounts to the chassis proximate the suspension for the wheel and chassis. The jack 262 retracts inwardly of the shell 16 and extends downwardly to the ground to maintain the travel trailer level and stable when positioned at a campsite or other location for use of the travel trailer. The jack 262 includes a connector 264 for manual operation of the jack 262.

The roof of the travel trailer 10 holds the satellite antenna 13 as an optional entertainment feature. The HVAC air conditioning/heating unit 15 mounts to a back portion of the roof. The HVAC unit is a conventional device such as a DUO THERM unit provided by Dometic USA, of Elkhart, Ind., which provides other conventional equipment for the recreational vehicle industry, including awnings, refrigerators, toilet systems, microwaves, and accessories.

The travel trailer 10 incorporates power supplies. A first such supply is a reel-out plug-in extendable cord that connects to a conventional electrical outlet. Propane gas is provided, such as for operating the range. Also, battery power provided by a battery pack mounted in a rear compartment of the travel trailer provides electrical supply such as for lighting.

The refrigerator is a conventional travel industry type refrigerator that operates on propane, electrical current supplied from conventional electrical outlets, or battery.

Lighting fixtures are conventional and includes runner lights positioned close to the floor for illumination and light attached to undersurfaces of cabinets.

A housing (not illustrated) for an awning optionally mounts to the roof on the entrance side of the travel trailer.

A hot water tank communicates with the fresh water tank for supplying hot water to the kitchen sink, the bathroom sink, and the shower.

An inverter optionally provides power at conventional 120 volts.

With reference to FIGS. 2 and 3, the travel trailer 10 assembles from molded fiberglass shells in which the exterior lower shell 16 receives the sanitary holding tank 30 and fresh water supply tank 34, with appropriate piping to connect to infeed and discharge supply. The exterior lower shell mounts to the chassis 90. With reference to FIG. 4, fasteners extend through openings 98, 100 and with plates 102 are secured with nut to attach the shell and chassis together.

The interior lower shell 40 defines structural features for the interior of the travel trailer. Piping, electrical wiring and insulation install between the shells. The bathroom assembly inserts into the lower interior chassis. The exterior upper shell 18 and interior upper shell 80 similarly connect together after appropriate wiring and insulation. The shells connect together at mating edges to form the enclosed housing. Cabinets are closed with doors, the windows install in cut-out openings in the side walls, and doors are attached. Appliances install in the areas provided for supporting such and connected to electrical supplies or fuel supply. The air conditioning/heating system installs on the roof. The travel trailer is completed with upholstery cushions and pads on seating areas and for sleeping areas.

For use, the travel trailer is connected by the hitch to a tow vehicle. At a camping location, the jacks 244 and 262 are operated to fix the trailer level relative to the ground. The power and fuel systems are operated to provide electrical current to the travel trailer and to provide fuel to the stove and other fuel operated appliances.

The travel trailer disclosed herein can be made and executed without undue experimentation in light of the present disclosure. While the apparatus and methods of this invention have been described in terms of illustrative embodiments, it will be apparent to those of skill in the art that variations may be applied to the apparatus and in the method steps or in the sequence of steps thereof described herein without departing from the concept, spirit and scope of the invention. All such similar substitutes and modifications apparent to those skilled in the art are deemed to be within the spirit, scope and concept of the invention as defined by the appended claims.

What is claimed is:

1. A travel trailer, comprising:
    an exterior lower shell and an exterior upper shell, each molded as a single unitary body and configured with a mating edge for overlapping joining of the exterior lower shell and the exterior upper shell, the opposing exterior lower shell and the exterior upper shell each defining a slotted opening extending from the respective edge for a passageway into an interior of the travel trailer;
    an interior lower shell received in the exterior lower shell and defining pre-molded floor and side walls, and having a seating area with opposed benches, a cabinet structure configured for receiving a refrigerator and stove top, an opposing bench, and defining an aisle centrally therebetween;
    a shower pan seated on the floor and attached to at least one side wall;
    an interior upper shell received in the exterior upper shell and defining pre-molded ceiling, opposing side walls, opposing L-shaped walls extending from the ceiling and extending to a respective side wall to define storage areas accessed through selectively operated doors;
    a wall defining a second door to separate a bathroom portion; and
    a wheeled chassis connected to the exterior lower shell and defining a longitudinally extending tongue configured for attaching to a trailer hitch of a motor vehicle for moving the travel trailer.

2. The travel trailer as recited in claim 1, wherein the chassis comprises:
    a pair of spaced-apart longitudinal members; and
    a plurality of spaced-apart transverse members attached to the longitudinal members; and
    wherein the exterior lower shell defines two U-shaped channels extending longitudinally and aligned for each receiving a respective one of the longitudinal members; and
    attachment means for securing the lower shell to the chassis.

3. The travel trailer as recited in claim 2, wherein the attachment means comprises four fastener assemblies for securing the exterior lower shell to the chassis at four points.

4. The travel trailer as recited in claim 3, wherein each fastener assembly comprises:
    a bolt having a threaded distal end;
    a plate defining an opening for receiving the bolt and seated on a channel of the exterior lower shell; and
    the exterior lower shell defining an opening;
    a member of the chassis defining an opening,
    whereby the bolt received through the aligned openings in the plate, the channel, and the member, receives a nut on the threaded distal end for securing the exterior lower shell to the chassis.

5. The travel trailer as recited in claim 1, further comprising a bathroom assembly received in a portion of the exterior lower shell, having a unitary molded floor, transverse wall defining an opening for a doorway, a second wall extending from side edge of the transverse wall, and a sink.

6. The travel trailer as recited in claim 5, wherein the sink in the bathroom assembly is defined in a surface of a cabinet structure extending from a side wall thereof, said cabinet structure defining an interior storage space accessible through an opening in a side face of thereof.

7. The travel trailer as recited in claim 1, further comprising a rear bumper assembly, comprising:
    a back housing having opposing top and bottom plates and a back plate with opposing sides to define a cavity therein and having an open face;
    a bumper member pivotably attached to the sides of the back housing, movable from a first position covering the open face and a second position pivoted away from the back housing for access therein through the open face.

8. The travel trailer as recited in claim 7, wherein the back housing includes a valved elongated conduit that communicates with a sanitary waste holding tank, the conduit selectively opened for discharge of the sanitary waste holding tank.

9. The travel trailer as recited in claim 1, wherein the exterior lower shell defines a sub-floor space having spaced-apart frame channels and an intermediate channel; and further comprising:
    a sanitary waste holding tank that communicates with waste water supply connected to at least a sink; and
    a fresh water tank that communicates with a fresh water supply connected to at least a sink,
    the sanitary waste holding tank and fresh water tank disposed between respective ones of the frame channels and the intermediate channel.

10. The travel trailer as recited in claim 1, further comprising a storage compartment mounted on a tongue of a trailer chassis adjacent a forward surface of the exterior lower shell.

11. The travel trailer as recited in claim 10, wherein the storage compartment further comprises a holding bracket for at least one gas fuel supply tank and a valve for selective communication of a fuel to a fuel using appliance.

* * * * *